(12) United States Patent
Hanes, Jr. et al.

(10) Patent No.: US 7,000,702 B2
(45) Date of Patent: Feb. 21, 2006

(54) ENVIRONMENTALLY BENIGN VISCOUS WELL TREATING FLUIDS AND METHODS

(75) Inventors: Robert E. Hanes, Jr., Duncan, OK (US); Jim D. Weaver, Duncan, OK (US); Billy F. Slabaugh, Duncan, OK (US); David M. Barrick, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 210 days.

(21) Appl. No.: 10/664,206

(22) Filed: Sep. 17, 2003

(65) Prior Publication Data

US 2005/0056424 A1 Mar. 17, 2005

(51) Int. Cl.
*E21B 43/17* (2006.01)
(52) U.S. Cl. .................................. 166/308.5; 507/273

(58) Field of Classification Search ............. 166/308.1, 166/308.5; 507/273
See application file for complete search history.

(56) References Cited

U.S. PATENT DOCUMENTS

| | | | |
|---|---|---|---|
| 5,224,546 A * | 7/1993 | Smith et al. ................. | 166/300 |
| 5,877,127 A * | 3/1999 | Card et al. .................... | 507/273 |
| 6,024,170 A * | 2/2000 | McCabe et al. ............. | 166/300 |
| 6,232,273 B1 * | 5/2001 | Namba et al. ................ | 507/90 |
| 6,488,091 B1 | 12/2002 | Weaver et al. .............. | 166/300 |

* cited by examiner

*Primary Examiner*—David Bagnell
*Assistant Examiner*—Matthew J. Smith
(74) *Attorney, Agent, or Firm*—Robert A. Kent; Baker Botts

(57) ABSTRACT

Environmentally safe viscous well treating fluids and methods are provided by the present invention. The treating fluids are basically comprised of water, a viscosity producing polymer, a boron cross-linking agent for cross-linking the polymer, and a delayed cross-link delinker that chelates the boron and breaks the treating fluid into a low viscosity fluid selected from polysuccinamide and polyaspartic acid.

53 Claims, No Drawings

ENVIRONMENTALLY BENIGN VISCOUS WELL TREATING FLUIDS AND METHODS

BACKGROUND OF THE INVENTION

1. Field of the Invention

The present invention provides environmentally safe viscous well treating fluids and methods of treating subterranean zones therewith.

2. Description of the Prior Art

Viscous treating fluids are used in a variety of operations and treatments in oil and gas wells. Such operations and treatments include, but are not limited to, well completion operations and production stimulation treatments.

An example of a well completion operation involving the use of viscous treating fluids is gravel packing. In gravel packing operations, solid gravel particles such as graded sand are carried to a subterranean zone in which a gravel pack is to be placed by a viscous gelled treating fluid. That is, the gravel is suspended in the viscous fluid at the surface and carried to the subterranean zone in which the gravel pack is to be placed. Once the gravel is placed in the zone, the viscous gelled treating fluid is broken (the viscosity is reduced) and recovered. The gravel pack produced functions as a filter to separate formation solids from produced fluids while permitting the produced fluids to flow into and through the well bore.

An example of a production stimulation treatment utilizing a viscous treating fluid is hydraulic fracturing. That is, a viscous gelled treating fluid, referred to in the art as a fracturing fluid, is pumped through the well bore into a subterranean zone to be stimulated at a rate and pressure such that fractures are formed and extended into the subterranean zone. The fracturing fluid also carries particulate proppant material, e.g., graded sand, into the fractures. The proppant material is suspended in the viscous fracturing fluid so that the proppant material is deposited in the fractures when the viscous fracturing fluid is broken and recovered. The proppant material functions to prevent the formed fractures from closing whereby conductive channels are formed through which produced fluids can flow to the well bore. The usual candidates for fracturing or other stimulation procedures are production wells completed in oil and/or gas containing formations. However, injection wells used in secondary or tertiary recovery operations, for example, for the injection of water and gas, may also be fractured in order to facilitate the injection of the fluid into subterranean formations.

After the viscous fracturing fluid has been pumped into a subterranean zone in a formation and fracturing of the zone has taken place, the fracturing fluid is removed from the formation to allow produced hydrocarbons to flow through the created fractures. Generally, the removal of the viscous fracturing fluid is accomplished by converting the fracturing fluid into a low viscosity fluid. This has been accomplished by adding a delayed breaker, i.e., a viscosity reducing agent, to the fracturing fluid prior to pumping it into the subterranean zone.

The viscous treating fluids utilized heretofore have predominately been water-based fluids containing a gelling agent comprised of a polysaccharide such as guar gum. Guar and its derivatives such as hydroxypropylguar are economical water soluble polymers that can be used to create high viscosity in an aqueous fluid and are readily cross-linked which further increases the viscosity of the fluid. While the use of gelled and cross-linked polysaccharide treating fluids has been highly successful, some of the components in the treating fluids, particularly the delayed cross-link delinkers or breakers utilized have not been environmentally benign. Thus, there are needs for improved subterranean zone treating fluids and methods whereby the treating fluids include environmentally benign components.

SUMMARY OF THE INVENTION

The present invention provides environmentally benign viscous well treating fluids and methods of using the treating fluids which meet the needs described above and overcome the deficiencies of the prior art. A method of the present invention for treating a subterranean zone penetrated by a well bore comprises the following steps. A gelled and cross-linked viscous treating fluid that comprises water, a viscosity producing polymer, a boron cross-linking agent for cross-linking the polymer, and a delayed cross-link delinker. Thereafter, the cross-linked viscous treating fluid is introduced into the subterranean zone.

In another embodiment, the present invention provides a viscous treating fluid that delayingly breaks into a low viscosity fluid that comprises water, a viscosity producing polymer, a boron cross-linking agent, and a delayed cross-link delinker.

In another embodiment, the present invention provides a method of reducing the viscosity of a viscous treating fluid comprising the steps of: providing a viscous treating fluid that comprises a boron cross-linked viscosity producing polymer and a delayed cross-link delinker, the delayed cross-link delinker comprising polysuccinimide or polyaspartic acid; and allowing the cross-linked viscosity producing polymer and the delayed cross-link delinker to interact so as to reduce the viscosity of the viscous treating fluid.

In another embodiment, the present invention provides a viscous treating fluid comprising a boron cross-linked viscosity producing polymer and a delayed cross-link delinker, the delayed cross-link delinker comprising polysuccinimide or polyaspartic acid.

The objects, features and advantages of the present invention will be readily apparent to those skilled in the art upon a reading of the description of preferred embodiments which follows.

DESCRIPTION OF PREFERRED EMBODIMENTS

The present invention provides methods of treating subterranean zones penetrated by well bores and environmentally benign viscous treating fluids that meet the needs described above and overcome the deficiencies of the prior art. The environmentally benign viscous treating fluids of this invention that delayingly break into low viscosity fluids are basically comprised of water, a viscosity producing polymer, a boron cross-linking agent for cross-linking the polymer, and a delayed cross-link delinker that chelates the boron and breaks the treating fluid into a low viscosity fluid comprising polysuccinimide or polyaspartic acid.

The water utilized in the treating fluids of this invention can be fresh water or salt water. The term "salt water" is used herein to mean unsaturated salt solutions and saturated salt solutions including brines and sea water.

A variety of viscosity producing polymers can be utilized in the treating fluids of this invention including, but not limited to, guar, guar derivatives, cellulose derivatives and biopolymers such as guar, hydroxypropylguar, carboxymethylhydroxypropylguar, carboxymethylguar, hydroxyethylcellulose, hydroxyethylcellulose grafted with glycidol or vinyl phosphonic acid, carboxymethylcellulose, carboxymethylhydroxyethylcellulose, xanthan, succinoglycon and the like. Of these, hydroxypropylguar is preferred.

A more preferred viscosity producing polymer for use in accordance with this invention is a substantially fully hydrated depolymerized polymer formed from a polysaccharide of the type set forth above.

Substantially fully hydrated depolymerized polymers can be manufactured by various means. For example, such a polymer can be manufactured by forming a hydratable polymer having a relatively high molecular weight as a result of derivatization of a polysaccharide and then subjecting it to extensive deploymerization whereby the polymer backbone is divided into short chain polymer segments. Specific manufacturing techniques and descriptions of the substantially fully hydrated depolymerized polymers useful in accordance with the present invention are set forth in detail in U.S. Pat. No. 6,488,091 B1 issued on Dec. 3, 2002 to Weaver, et al. which is incorporated in its entirety herein by reference thereto. Of the various substantially fully hydrated depolymerized polymers that are useful in accordance with this invention, a substantially fully hydrated depolymerized hydroxypropylguar polymer is preferred.

The viscosity producing polymer utilized is present in the treating fluid in an amount in the range of from about 0.12% to about 2.5% by weight of the water therein.

Examples of boron cross-linking agents for cross-linking the viscosity producing polymer include, but are not limited to, boric acid, disodium octaborate tetrahydrate, sodium diborate, pentaborates and minerals containing boron that release the boron upon hydrolysis. Of these, boric acid is preferred. The boron cross-linking agent utilized is present in the treating fluid in an amount in the range of from 0.0025% to about 0.1% by weight of the water therein.

The polysuccinimide and polyaspartic acid delayed cross-link delinker used in the treating fluid is environmentally benign and functions to chelate the boron and break the treating fluid into a low viscosity fluid. Of these two, polysuccinimide is generally preferred. The delayed cross-link delinker utilized is present in the treating fluid in an amount in the range of from about 0.1% to about 1% by weight of the water therein.

The treating fluid of this invention can also include a pH adjusting compound for elevating the pH of the treating fluid to in the range of from about 7 to about 12. The pH adjusting compound is required for crosslinked fluid systems which are dependent upon the pH of the gelling agent solution used. Suitable pH adjusting compounds include, but are not limited to, sodium hydroxide, potassium hydroxide and lithium hydroxide. Of these, sodium hydroxide is preferred. When used, the pH adjustment compound utilized is present in the treating fluid in an amount in the range of from about 0.01% to about 1% by weight of the water therein.

The treating fluid of this invention can also include a buffer to maintain the pH at the desired level, i.e., a pH level in the range of from about 7 to about 12. Examples of buffers that can be utilized include, but are not limited to, sodium carbonate, potassium carbonate, sodium bicarbonate, potassium bicarbonate, sodium diacetate, potassium diacetate, sodium phosphate, potassium phosphate, sodium dihydrogen phosphate and potassium dihydrogen phosphate. Of these, sodium carbonate is preferred. When used, the buffer is present in the treating fluid in an amount in the range of from 0.01% to about 0.25% by weight of the water therein.

Another component which can optionally be included in the treating fluid is a surfactant for preventing the formation of emulsions between the treating fluid and subterranean formation fluids. Examples of surfactants that can be utilized include, but are not limited to, alkyl sulfonates, alkyl aryl sulfonates such as a salt of dodecylbenzene sulfonic acid, alkyl trimethylammonium chloride, branched alkyl ethoxylated alcohols, phenol-formaldehyde nonionic resin blends, cocobetaines, dioctylsodium sulfosuccinate, imodazolines, alpha olefin sulfonates, linear alkyl ethoxylated alcohols and trialkyl benzylammonium chloride. Of these, a salt of dodecylbenzene sulfonic acid is preferred. When used, the surfactant is included in the treating fluid in an amount in the range of from about 0.008% to about 0.3% by weight of the water therein.

A variety of other additives can be included in the treating fluid which are well known in the art. Examples of such additives include, but are not limited to, clay stabilizers, fluid loss control agents and the like.

The methods of this invention are basically comprised of the following steps. An environmentally benign gelled and cross-linked viscous treating fluid as described above is prepared. Thereafter, the treating fluid is introduced into a subterranean zone to be treated.

As mentioned above, the treating fluid of this invention can be used in various operations and treatments conducted in subterranean zones penetrated by well bores. Examples of such treatments include placing gravel packs in subterranean zones, fracturing subterranean zones and the like.

A preferred environmentally benign viscous treating fluid of this invention that delayingly breaks into a low viscosity fluid comprises: water; a viscosity producing polymer; a boron cross-linking agent for cross-linking the polymer; and a delayed cross-link delinker that chelates the boron and breaks the treating fluid into a low viscosity fluid that comprises polysuccinimide and polyaspartic acid.

A preferred method of this invention for treating a subterranean zone penetrated by a well bore comprises the steps of: (a) preparing an environmentally benign gelled and cross-linked viscous treating fluid that delayingly breaks into a low viscosity fluid comprising water, a viscosity producing polymer, a boron cross-linking agent for cross-linking the polymer, and a delayed cross-link delinker that comprises polysuccinimide and polyaspartic acid, and (b) introducing the treating fluid into the subterranean zone.

A gelled and cross-linked viscous treating fluid was prepared in the laboratory comprising fresh water, a guar gum based viscosity producing polymer, a caustic compound for adjusting the pH to alkaline and a boric acid cross-linking compound. The temperature of a sample of the treating fluid was raised to about 250 degrees Fahrenheit and the viscosity was measured over time using a Brookfield viscometer. To additional samples of the treating fluid, various amounts of polysuccinimide cross-link delinker were added. The temperatures of the additional samples were raised and the viscosities were measured as described above. The results of these tests are shown in the Table below.

TABLE

Effect of Delinker Amount on Delinking Time

| Time, Min | Temp. F. | Viscosity, cP; no delinker | Viscosity, cP; 1 gram of delinker | Viscosity, cP; 2 grams of delinker | Viscosity, cP; 4 grams of delinker |
|---|---|---|---|---|---|
| 0 | 96.4 | 1267 | 1631 | 1977 | 1182 |
| 10 | 170.1 | 2492 | 2492 | 2498 | 2495 |
| 20 | 250.2 | 1074 | 1050 | 1253 | 1122 |

TABLE-continued

Effect of Delinker Amount on Delinking Time

| Time, Min | Temp. F. | Viscosity, cP; no delinker | Viscosity, cP; 1 gram of delinker | Viscosity, cP; 2 grams of delinker | Viscosity, cP; 4 grams of delinker |
|---|---|---|---|---|---|
| 30 | 249.9 | 1156 | 1183 | 1003 | 1072 |
| 40 | 250.7 | 1166 | 1156 | 1271 | 909 |
| 50 | 250.9 | 1086 | 1101 | 1278 | 949 |
| 60 | 251 | 1203 | 988 | 1157 | 769 |
| 70 | 250.9 | 1137 | 996 | 1046 | 665 |
| 80 | 251.1 | 1014 | 924 | 882 | 528 |
| 90 | 251.1 | 969 | 840 | 1005 | 381 |
| 100 | 250.9 | 1030 | 847 | 1001 | 335 |
| 110 | 250.9 | 962 | 1086 | 1027 | 299 |
| 120 | 250.7 | 906 | 1026 | 976 | 220 |
| 130 | 250.9 | 905 | 1029 | 943 | 178 |
| 140 | 250.5 | 905 | 1021 | 845 | 146 |
| 150 | 250.4 | 905 | 700 | 785 | 59 |
| 160 | 250.2 | 905 | 943 | 780 | 83 |
| 170 | 250.3 | 905 | 819 | 701 | 50 |
| 180 | 249.9 | 905 | 710 | 636 | |
| 190 | 249.8 | 905 | 735 | 499 | |
| 200 | 249.8 | 905 | 720 | 563 | |
| 210 | 249.8 | 905 | 557 | 430 | |
| 220 | 250.1 | 905 | 525 | 365 | |
| 230 | 250.2 | 905 | 524 | 345 | |
| 240 | 250.2 | 905 | 524 | 283 | |

Experimental Conditions: A depolymerized hydroxypropyl guar with a base gel viscosity of 16 cP in water was crosslinked with 4 lbs/1000 gal of boric acid and 5 gal/1000 gal of caustic per gram of delinker.

From the Table above, it can be seen that as more delinker is added to the treating fluid, the delinking time is reduced.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of treating a subterranean zone penetrated by a well bore comprising the steps of:
   providing a gelled and cross-linked viscous treating fluid that comprises water, a viscosity producing polymer, a boron cross-linking agent for cross-linking the polymer, and a delayed cross-link delinker wherein the delayed cross-link delinker is polysuccinimide or polyaspartic acid; and
   introducing the treating fluid into the subterranean zone.

2. The method of claim 1 wherein the water is fresh water or salt water.

3. The method of claim 1 wherein the viscosity producing polymer is guar, a guar derivative, a cellulose derivative, hydroxypropylguar, carboxymethylhydroxypropylguar, carboxymethylguar, hydroxyethylcellulose, hydroxyethylcellulose grafted with glycidol or vinyl phosphonic acid, carboxymethylcellulose, carboxymethylhydroxyethylcellulose, xanthan, or succinoglycan.

4. The method of claim 1 wherein the viscosity producing polymer comprises a substantially fully hydrated depolymerized polymer.

5. The method of claim 1 wherein the viscosity producing polymer is a substantially fully hydrated depolymerized guar, cellulose derivative, hydroxypropylguar, carboxymethylhydroxypropylguar, carboxymethylguar, hydroxyethylcellulose, carboxymethylcellulose, or carboxymethylhydroxy-ethylcellulose.

6. The method of claim 1 wherein the viscosity producing polymer comprises a substantially fully hydrated depolymerized hydroxypropylguar.

7. The method of claim 1 wherein the viscosity producing polymer is present in the treating fluid in an amount in the range of from about 0.12% to about 2.5% by weight of the water therein.

8. The method of claim 1 wherein the boron cross-linking agent for cross-linking the polymer is boric acid, disodium octaborate tetrahydrate, sodium diborate, a pentaborate, or a mineral containing boron that is capable of releasing boron upon hydrolysis.

9. The method of claim 1 wherein the boron cross-linking agent comprises boric acid.

10. The method of claim 1 wherein the boron cross-linking agent is present in the treating fluid in an amount in the range of from about 0.0025% to about 0.1% by weight of the water therein.

11. The method of claim 1 wherein the delayed cross-link delinker is present in the treating fluid in an amount in the range of from about 0.1% to about 1% by weight of the water therein.

12. The method of claim 1 wherein the viscous treating fluid further comprises a pH adjusting compound.

13. The method of claim 12 wherein the pH adjusting compound is sodium hydroxide, potassium hydroxide, or lithium hydroxide.

14. The method of claim 12 wherein the pH adjusting compound comprises sodium hydroxide.

15. The method of claim 12 wherein the pH adjusting compound is present in the treating fluid in an amount in the range of from about 0.01% to about 1% by weight of the water therein.

16. The method of claim 1 wherein the viscous treating fluid further comprises a buffer.

17. The method of claim 16 wherein the buffer is sodium carbonate, potassium carbonate, sodium bicarbonate, potassium bicarbonate, sodium diacetate, potassium diacetate, sodium phosphate, potassium phosphate, sodium dihydrogen phosphate, or potassium dihydrogen phosphate.

18. The method of claim 16 wherein the buffer comprises sodium carbonate.

19. The method of claim 16 wherein the buffer is present in the treating fluid in an amount in the range of from about 0.01% to about 0.25% by weight of the water therein.

20. The method of claim 1 wherein the viscous treating fluid further comprises a surfactant, the surfactant being capable of preventing the formation of emulsions between the treating fluid and subterranean formation fluids.

21. The method of claim 20 wherein the surfactant is an alkyl sulfonate, an alkyl aryl sulfonate, a salt of dodecylbenzene sulfonic acid, an alkyl trimethylammonium chloride, a branched alkyl ethoxylated, alcohol, a phenol-formaldehyde nonionic resin blend, a cocobetaine, a dioctylsodium sulfosuccinate, an imodazoline, an alpha olefin sulfonate, a linear alkyl ethoxylated alcohol, or a trialkyl benzylanimonium chloride.

22. The method of claim 20 wherein the surfactant comprises a salt of dodecylbenzene sulfonic acid.

23. The method of claim 20 wherein the surfactant is present in the treating fluid in an amount in the range of from about 0.01% to about 0.3% by weight of the water therein.

24. A viscous treating fluid that delayingly breaks into a low viscosity fluid comprising:
   water;
   a viscosity producing polymer;
   a boron cross-linking agent; and a delayed cross-link delinker wherein the delayed cross-linker is polysuccinimide or polyaspartic acid.

25. The viscous treating fluid of claim 24 wherein the water is fresh water or salt water.

26. The viscous treating fluid of claim 24 wherein the viscosity producing polymer is guar, a guar derivative, a cellulose derivative, hydroxypropylguar, carboxymethylhydroxypropylguar, carboxymethylguar, hydroxyethylcellulose, hydroxyethylcellulose grafted with glycidol or vinyl phosphonic acid, carboxymethylcellulose, carboxymethylhydroxyethylcellulose, xanthan, or succinoglycan.

27. The viscous treating fluid of claim 24 wherein the viscosity producing polymer comprises a substantially fully hydrated depolymerized polymer.

28. The viscous treating fluid of claim 24 wherein the viscosity producing polymer is a substantially fully hydrated depolymerized guar or cellulose derivative comprising hydroxypropylguar, carboxymethylhydroxypropylguar, carboxymethylguar, hydroxyethylcellulose, carboxymethylcellulose, or carboxymethylhydroxy-ethylcellulose.

29. The viscous treating fluid of claim 24 wherein the viscosity producing polymer comprises a substantially fully hydrated depolymerized hydroxypropylguar.

30. The viscous treating fluid of claim 24 wherein the viscosity producing polymer is present in the treating fluid in an amount in the range of from about 0.12% to about 2.5% by weight of the water therein.

31. The viscous treating fluid of claim 24 wherein the boron cross-linking agent for cross-linking the polymer is boric acid, disodium octaborate tetrahydrate, sodium diborate, a pentaborate, or a mineral containing boron.

32. The viscous treating fluid of claim 24 wherein the boron cross-linking compound comprises boric acid.

33. The viscous treating fluid of claim 24 wherein the boron cross-linking agent is present in the treating fluid in an amount in the range of from about 0.0025% to about 0.1% by weight of the water therein.

34. The viscous treating fluid of claim 24 wherein the delayed cross-link delinker is present in the treating fluid in an amount in the range of from about 0.1% to about 1% by weight of the water therein.

35. The viscous treating fluid of claim 24 that further comprises a pH adjusting compound.

36. The viscous treating fluid of claim 35 wherein the pH adjusting compound is sodium hydroxide, potassium hydroxide, or lithium hydroxide.

37. The viscous treating fluid of claim 35 wherein the pH adjusting compound comprises sodium hydroxide.

38. The viscous treating fluid of claim 35 wherein the pH adjusting compound is present in the treating fluid in an amount in the range of from about 0.01% to about 1% by weight of the water therein.

39. The viscous treating fluid of claim 24 that further comprises a buffer.

40. The viscous treating fluid of claim 39 wherein the buffer is sodium carbonate, potassium carbonate, sodium bicarbonate, potassium bicarbonate, sodium diacetate, potassium diacetate, sodium phosphate, potassium phosphate, sodium dihydrogen phosphate, or potassium dihydrogen phosphate.

41. The viscous treating fluid of claim 39 wherein the buffer comprises sodium carbonate.

42. The viscous treating fluid of claim 39 wherein the buffer is present in the treating fluid in an amount in the range of from about 0.01% to about 0.25% by weight of the water therein.

43. The viscous treating fluid of claim 24 wherein the treating fluid further comprises a surfactant.

44. The viscous treating fluid of claim 43 wherein the surfactant is an alkyl sulfonate, an alkyl aryl sulfonate, a salt of dodecylbenzene sulfonic acid, an alkyl trimethylammonium chloride, a branched alkyl ethoxylated, alcohol, a phenol-formaldehyde nonionic resin blend, a cocobetaine, a dioctylsodium sulfosuccinate, an imodazoline, an alpha olefin, sulfonate, a linear alkyl ethoxylated alcohol, or a trialkyl benzylammonium chloride.

45. The viscous treating fluid of claim 43 wherein the surfactant comprises a salt of dodecylbenzene sulfonic acid.

46. The viscous treating fluid of claim 43 wherein the surfactant is present in the treating fluid in an amount in the range of from about 0.01% to about 0.3% by weight of the water therein.

47. The viscous treating fluid of claim 24 wherein the boron cross-linking agent is capable of crosslinking the viscosity producing polymer.

48. The viscous treating fluid of claim 24 wherein the delayed cross-link delinker is capable of chelating boron.

49. The viscous treating fluid of claim 24 wherein the delayed cross-link delinker is capable of breaking the viscous treating fluid into a lower viscosity viscous treating fluid.

50. A viscous treating fluid comprising a boron cross-linked viscosity producing polymer and a delayed cross-link delinker, wherein the delayed cross-link delinker is polysuccinimide or polyaspartic acid.

51. The method of claim 50 wherein the viscous treating fluid is suitable for placing gravel packs or fracturing subterranean zones.

52. The method of claim 50 wherein the boron cross-linked viscosity producing polymer is formed by cross-linking a viscosity producing polymer with a boron cross-linking agent.

53. A method of reducing the viscosity of a viscous treating fluid comprising the steps of:
providing a viscous treating fluid that comprises a boron cross-linked viscosity producing polymer and a delayed cross-link delinker, wherein the delayed cross-link delinker is polysuccinimide or polyaspartic acid; and
allowing the cross-linked viscosity producing polymer and the delayed cross-link delinker to interact so as to reduce the viscosity of the viscous treating fluid.

* * * * *